May 12, 1931.                  G. G. WAITE                  1,804,576

REMOTE METERING SYSTEM

Filed Nov. 19, 1927

INVENTOR
Griffin G. Waite

BY
Wesley S. Carr
ATTORNEY

Patented May 12, 1931

1,804,576

UNITED STATES PATENT OFFICE

GRIFFIN G. WAITE, OF WILKINSBURG, PENNSYLVANIA, ASSIGNOR TO WESTINGHOUSE ELECTRIC & MANUFACTURING COMPANY, A CORPORATION OF PENNSYLVANIA

REMOTE METERING SYSTEM

Application filed November 19, 1927. Serial No. 234,439.

This invention concerns remote metering systems and is more particularly directed to the provision of means for transmitting the impulses utilized in such systems over existing telephone circuits.

Remote metering systems of the impulse type are now well known. In such systems it is customary to measure the electrical load on a distant portion of a large network by means of a watthour meter provided with a commutator. The operation of the watthour meter and its associated commutator generates impulses in a metering circuit at a rate proportional to the load being measured. These impulses are received by suitable apparatus and the reading of the distant meter is thus obtained.

Heretofore it has been necessary to provide special circuits for transmitting the impulses from the distant meter to the receiving station. It is one of the objects of my invention to provide means for generating impulses having such a wave form that they may be transmitted on existing telephone circuits without causing interference in the speech transmitting apparatus connected to said circuit.

Another object of my invention is to provide means for generating electrical impulses of such a wave form that when they are transmitted over a telephone circuit they will cause no audible sounds in the receivers connected to the circuit.

For a complete understanding of my invention, reference should be had to the accompanying drawings, in which.

Figure 1:
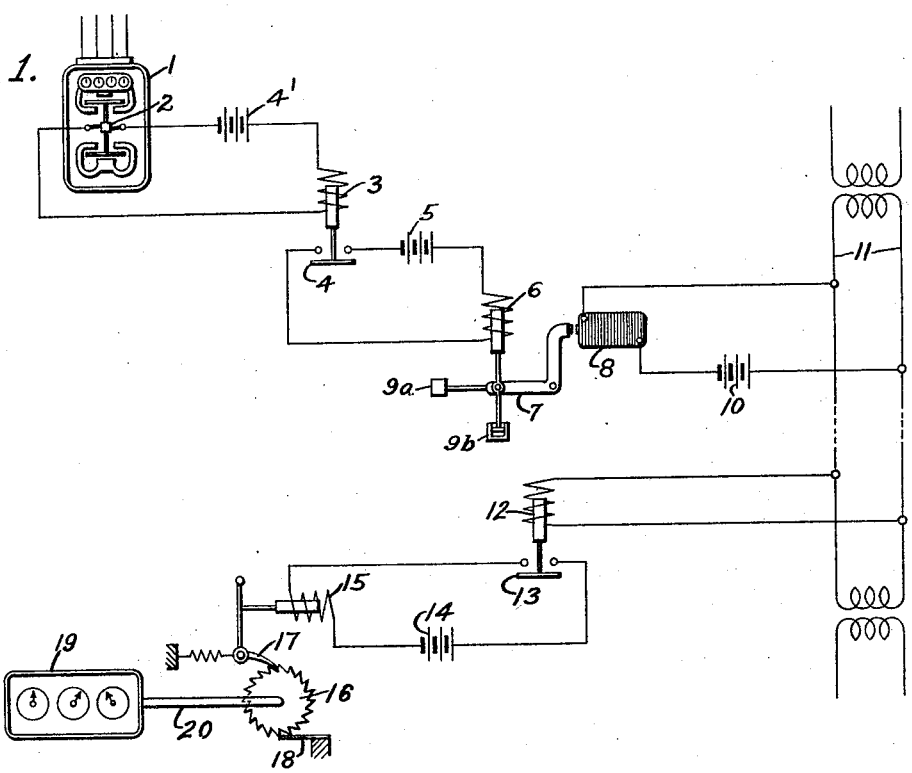
Figure 1 illustrates one modification of my invention.

Referring to Fig. 1, a watthour meter 1 is connected to measure the energy transmitted over any desired portion of a power network. The rotating element of the watthour meter 1 is provided with a commutator 2 which alternately makes and breaks a circuit including a relay winding 3 and a source of direct current 4'. The relay winding 3 operates a contact 4 which when closed completes a circuit including a battery 5 or other source of direct current and a solenoid 6. The core of the solenoid 6 actuates a bell crank 7 which controls the pressure exerted upon a carbon pile rheostat 8. This rheostat may normally be biased to its high-resistance condition by means of springs or other means not shown. A weight 9a and a dash-pot 9b may be utilized to increase the inertia of the moving elements of the rheostat so as to give it a slow action.

The rhetostat 8 is connected in series with a battery 10 to a telephone circuit 11. The portion of the apparatus above described is located at the distant point adjacent the load to be measured.

At any convenient control station, reached by the telephone circuit 11, is located the receiving apparatus which is not a part of this invention although a known type of such apparatus is illustrated in connection herewith.

This apparatus consists of a relay 12 which when energized closes its contact 13 to complete a circuit through a battery 14 to a solenoid 15. The solenoid 15 operates a ratchet wheel 16 by means of a pawl 17 and a stop 18. The ratchet wheel 16 is connected to a recording element 19 by a shaft 20. Obviously, a graphic recording meter may be used in addition to the recorder 19. The operation of the metering system just described is as follows:

The rotating element of the watthour meter 1 revolves at a speed proportional to the load being measured and generates impulses in the local circuit including the relay 3 which is periodically energized to close the circuit including the solenoid 6. The operation of the solenoid 6 causes the resistance of the circuit including the rheostat 8, the telephone line 11 and the relay 12 to be varied gradually in accordance with the impulses set up in the local circuit by the watthour meter commutator.

Figure 3:
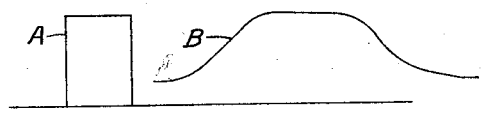
Fig. 3 illustrates the wave form of the impulse generated by my invention.

Because of the characteristics of the particular type of rheostat employed, the impulses transmitted over the telephone circuit have slowly rising and falling characteristics. The type of wave transmitted over the telephone circuit is illustrated in Fig. 3 in which A respresents the wave form of the current impulse set up in the local circuit including the relay 3 by the operation of the watthour meter commutator 2. B represents the wave form of the impulse set up in the telephone circuit 11 by the operation of the carbon pile rheostat 8 in response to energization of the solenoid 6 which is energized periodically at the same rate that the local circuit including the relay 3 is closed. It will be obvious to those skilled in the art that the transmission of an impulse having a wave form such as that indicated in A of Figure 3, over the telephone circuit 11 would cause an audible click in the receivers of any telephone apparatus connected to the line. The gradual rising and falling characteristics of the impulse generated by the slow-acting rheostat 8, which are illustrated as B in Figure 3, make possible the transmission of series of such impulses over telephone circuits without causing any interference with speech transmitting apparatus connected thereto.

The impulses transmitted over the circuit 11 actuate the receiving apparatus illustrated in the usual manner to cause the ratchet wheel 16 and the recording element 19 to be rotated at a rate corresponding to that at which the watthour meter 1 moves.

Figure 2:
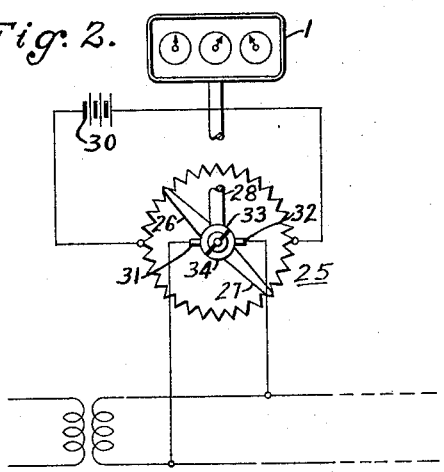
Fig. 2 illustrates a further modification of my invention.

Fig. 2 illustrates a further modification of my invention in which the watthour meter 1 controls the operation of a potentiometer 25 having a pair of arms 26 and 27 mounted on a rotating shaft 28 which is driven by the moving element of the watthour meter 1 in any suitable manner. The contact arms 26 and 27 are insulated from each other and sweep over a circular resistor element, to diametrically opposite points of which a battery 30 is connected. Brushes 31 and 32 make contact with commutator segments 33 and 34 which are electrically connected to the contact arms 26 and 27, respectively. The brushes 31 and 32 are connected to the telephone circuit 11.

It will be obvious from an inspection of Fig. 2 that when the contact arms 26 and 27 are horizontal, the full voltage of the battery 30 will be impressed on the circuit 11. When the contact arms are vertical, however, the potentiometer 25 interposes a maximum resistance in the circuit to the telephone line 11. Because of the rotation of the contact arms 26 and 27 from the horizontal to the vertical position in accordance with the watthour meter rotation, the current impulses set up in the circuit 11 will not have a sharply rising characteristic such as that illustrated at A in Figure 3 but will have a slowly rising and falling characteristic such as shown at B.

The receiving apparatus shown in Figure 1 may be operated by the impulse sender shown in Figure 2 and its operation in both cases is identical.

It is obvious that my invention obtains a very distinct advantage over impulse transmitting systems heretofore known in that the impulses generated by my invention have such a wave form that they may be transmitted over existing telephone circuits without causing any interference or audible sounds in the speech transmitting apparatus connected thereto.

My invention, of course, may be adapted for the transmission of the readings of meters of any type, merely by substituting the desired meter for the watthour meter 1.

Although I have illustrated and described but two modifications of my invention, I do not desire to be limited thereto since changes and modifications will occur to those skilled in the art and I intend that such changes as fall within the scope of the appended claims be considered as a part of my invention.

I claim as my invention:

1. A remote metering system comprising a watt-hour meter impulse sender, a relay responsive to the impulse sender, an adjustable resistor device connected to an energized telephone circuit, a solenoid device disposed to be controlled by the relay for periodically varying the effectiveness of the adjustable resistor device to effect the periodic generation of current impulses in the telephone circuit corresponding in number to the operations of the impulse sender, a registering device, and means responsive to the impulses transmitted over the telephone circuit for actuating the registering device.

2. A remote-metering system comprising a watthour-meter impulse sender, a relay responsive thereto and a solenoid controlled by said relay for varying the setting of an adjustable resistor connected to a telephone circuit, whereby impulses are generated in said circuit corresponding to the operations of said impulse sender, said impulses having a gradually rising and falling characteristic such that they do not affect speech transmitting apparatus connected to said circuit, and means for receiving and registering said impulses.

3. In a remote metering system, in combination, a sending station and a receiving station, a telephone circuit connecting the stations, a watt-hour meter at the sending station provided with rotating contact members, a battery, a carbon-pile resistor connected across the telephone circuit in series with the battery, means responsive to current impulses disposed to actuate the resistor to effect the sending of current impulses of comparatively flat wave form over the telephone circuit, means responsive to the operation of the contact members of the watthour meter for controlling the operation of the means for actuating the carbon-pile resistor and means at the receiving station for receiving and registering impulses transmitted over the telephone circuit.

4. In a remote metering system, in combination, a metering station and a receiving station connected by an energized telephone circuit, a registering device at the receiving station, a watt-hour meter at the metering station for measuring power, said watt-hour meter being provided with a rotating contacting device, means responsive to the operation of said rotating contacting device for generating a series of current impulses proportional in number to the amount of power measured by the watt-hour meter, a resistor device connected to the telephone circuit, electromagnetic means responsive to the series of current impulses for actuating the resistor device to effect the generation of a similar number of current impulses in the telephone circuit, said impulses having a gradually rising and falling characteristic, and means at the receiving station responsive to the impulses transmitted over the telephone circuit for actuating the registering device.

In testimony whereof, I have hereunto subscribed my name this 28th day of October 1927.

GRIFFIN G. WAITE.